W. S. WEIR, Jr.
Wheel Cultivator.
No. 37,251.
Patented Dec. 23, 1862.
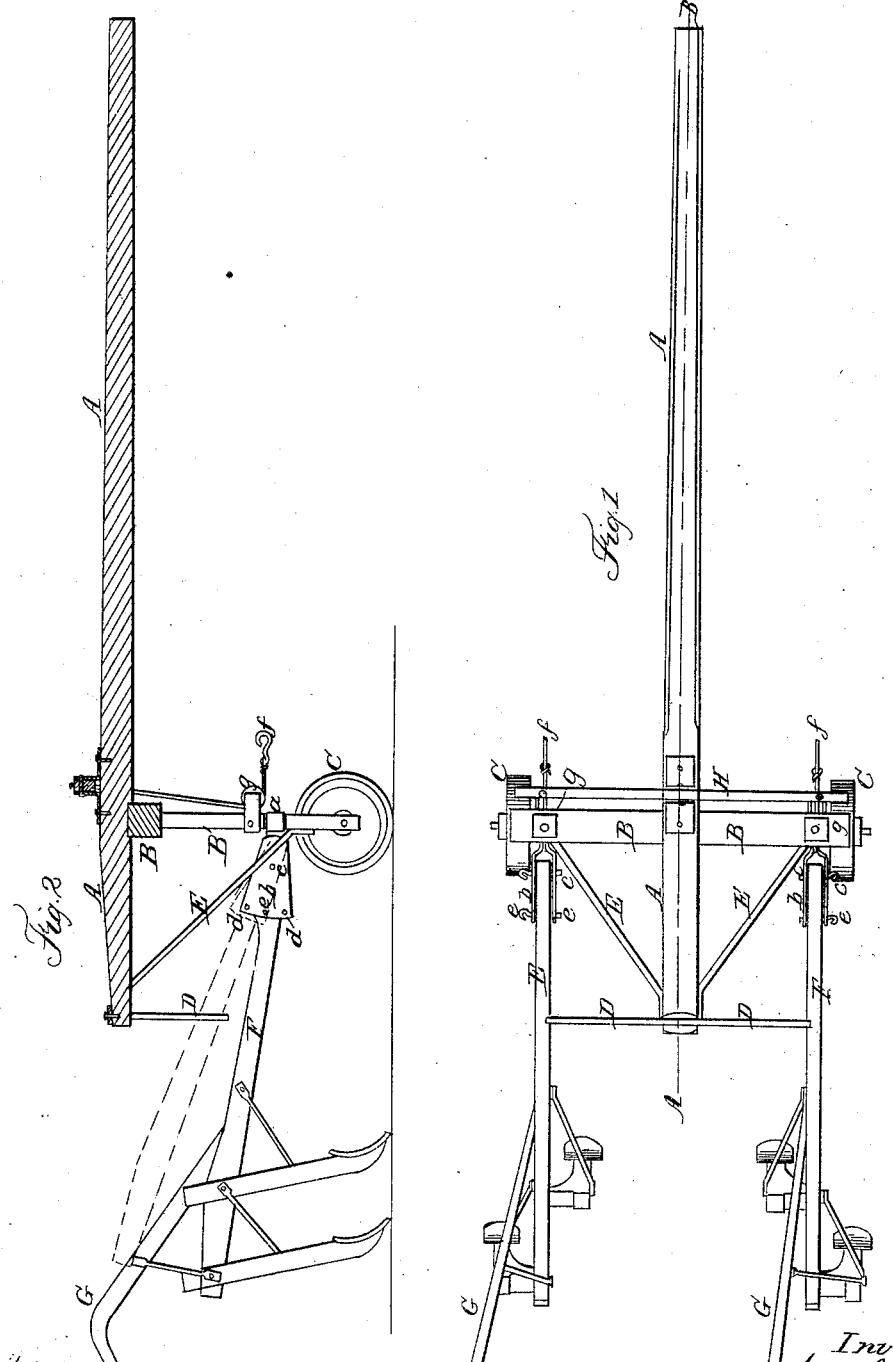

UNITED STATES PATENT OFFICE.

WILLIAM S. WEIR, JR., OF MONMOUTH, ILLINOIS.

IMPROVEMENT IN CULTIVATORS.

Specification forming part of Letters Patent No. 37,251, dated December 23, 1862.

*To all whom it may concern:*

Be it known that I, WM. S. WEIR, Jr., of Monmouth, in the county of Warren and State of Illinois, have invented certain new and useful Improvements in Corn-Plows; and I do hereby declare that the following is a full, clear, and exact description of the same, reference being had to the accompanying drawings, forming a part of this specification, and in which—

Figure 1 represents a plan view of the machine; and Fig. 2 represents a longitudinal section on line A B, Fig. 1.

In the drawings, A represents the tongue or draft-beam, made fast to the top of frame B, which rests on two wheels, C C, the journals of which project from the bottom of posts B' B' of frame B. Tongue A projects back in rear of frame B, and is there provided with a plow-supporting device, D, and is also connected with the bottom of the posts B' B' by means of a brace, E. The posts B' B' are turned off to receive the loop-pieces $a\ a$, to which the adjusting draft-pieces $b\ b$ are hinged.

The plow-beams are hinged between the adjusting draft-pieces $b\ b$ by means of bolts $c\ c$. The rear ends of the draft-pieces $b\ b$ are provided with a series of holes, $d$, by means of which and bolts $e$ the depth of furrow can be regulated—a hole being made in each plow-beam F. When it is desired to have the plows run deep the bolts $e$ are passed through the lower holes, $d$, and vice versa.

It will be observed that when the machine is drawn forward the attendant by means of the handles G G can raise up either plow or swing it to the right or left, thus enabling the machine to be used with ease in the cultivation of irregular rows of plants.

The plows can be quickly raised to free them from obstructions, and when the machine is to be transported from field to field the beams are to be raised up and allowed to rest on the supporting device D, whose ends are turned up to retain the beams thereon.

The horses are to be attached so as to draw from chains or ropes $f\ f$, which pass back under rolls $g\ g$, thence up to connect to the ends of a pivoted evener, H, whose vibration is vertical. By this arrangement, if one horse happens to get ahead of the other it does not affect the line of draft, which remains central all of the time.

Having described my invention, what I claim, and desire to secure by Letters Patent, is—

1. The combination and arrangement of the frame B, tongue A, and wheels C C, substantially as set forth.

2. The combination, with the posts B' B' and plow-beams, of the loops $a$ and draft-adjusting devices $b\ b$, substantially as set forth.

W. S. WEIR, JR.

Witnesses;
I. A. WELLMAN,
NEWTON BURR.